US012431941B2

(12) United States Patent
Gao

(10) Patent No.: US 12,431,941 B2
(45) Date of Patent: Sep. 30, 2025

(54) TRANSMISSION CONFIGURATION METHOD AND APPARATUS FOR MULTIPLE TRANSMISSION AND RECEPTION POINTS (TRPs)

(71) Applicant: Beijing Xiaomi Mobile Software Co., Ltd., Beijing (CN)

(72) Inventor: Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/693,300

(22) PCT Filed: Sep. 29, 2021

(86) PCT No.: PCT/CN2021/121719
§ 371 (c)(1),
(2) Date: Mar. 19, 2024

(87) PCT Pub. No.: WO2023/050154
PCT Pub. Date: Apr. 6, 2023

(65) Prior Publication Data

US 2025/0007561 A1 Jan. 2, 2025

(51) Int. Cl.
*H04B 7/024* (2017.01)
*H04L 5/00* (2006.01)

(52) U.S. Cl.
CPC ........... *H04B 7/024* (2013.01); *H04L 5/0051* (2013.01)

(58) Field of Classification Search
CPC ...... H04B 7/024; H04B 7/0456; H04B 7/063; H04L 5/0051; H04L 5/00; H04L 5/0035;
(Continued)

(56) References Cited

U.S. PATENT DOCUMENTS

2023/0063015 A1* 3/2023 Muruganathan ...... H04L 5/0091
2024/0015732 A1* 1/2024 Muruganathan .. H04W 72/1268

FOREIGN PATENT DOCUMENTS

WO WO 2021161223 A1 8/2021
WO 2022141050 A1 7/2022

OTHER PUBLICATIONS

International Search Report and Written Opinion of International Application No. PCT/CN2021/121719, dated Jun. 24, 2022, 18 pages.

(Continued)

*Primary Examiner* — Vineet S Panwalkar
(74) *Attorney, Agent, or Firm* — Finnegan, Henderson, Farabow, Garrett & Dunner, L.L.P.

(57) ABSTRACT

A method for transmission configuration for multiple transmission reception points (TRPs) is performed by a network device, wherein the multiple TRPs include a first TRP and a second TRP, and the method includes: determining configuration information for a sounding reference signal (SRS) resource indicator (SRI) indication field in downlink control information (DCI) according to SRS resource set configuration information of the first TRP and the second TRP; wherein the SRS resource set configuration information indicates a number of SRS resources included in a first SRS resource set corresponding to the first TRP and a number of SRS resources included in a second SRS resource set corresponding to the second TRP, and indicates whether the first SRS resource set and the second SRS resource set are used for a codebook function or a non-codebook function.

19 Claims, 8 Drawing Sheets determining configuration information for an SRI indication field in a DCI according to SRS resource set configuration information of the first TRP and the second TRP

S201

(58) Field of Classification Search
CPC .............. H04L 5/0094; H04W 72/232; H04W 72/1268
See application file for complete search history.

(56) References Cited

OTHER PUBLICATIONS

Moderator (Nokia, Nokia Shanghai Bell), “Summary #2 of Multi-TRP PUCCH and PUSCH Enhancements”, 3GPP TSG RAN WG1 #106-e, R1-2108299, e-Meeting, Aug. 16-27, 2021, 80 pages.
Extended European Search Report issued in Application No. 21958744.1 dated Oct. 16, 2024, 11 pages.
Catt, “Enhancements on multi-TRP/panel transmission for PDCCH, PUCCH and PUSCH”, 3GPP TSG RAN WG1 #106-e, R1-2106936, e-Meeting, Aug. 16-27, 2021, 21 pages.
Notice of Reasons for Refusal for Japanese Patent Application No. 2024 to 518933, dated May 20, 2025, 14 pages.

* cited by examiner determining configuration information for an SRI indication field in a DCI according to SRS resource set configuration information of the first TRP and the second TRP

Figures 2, 3:
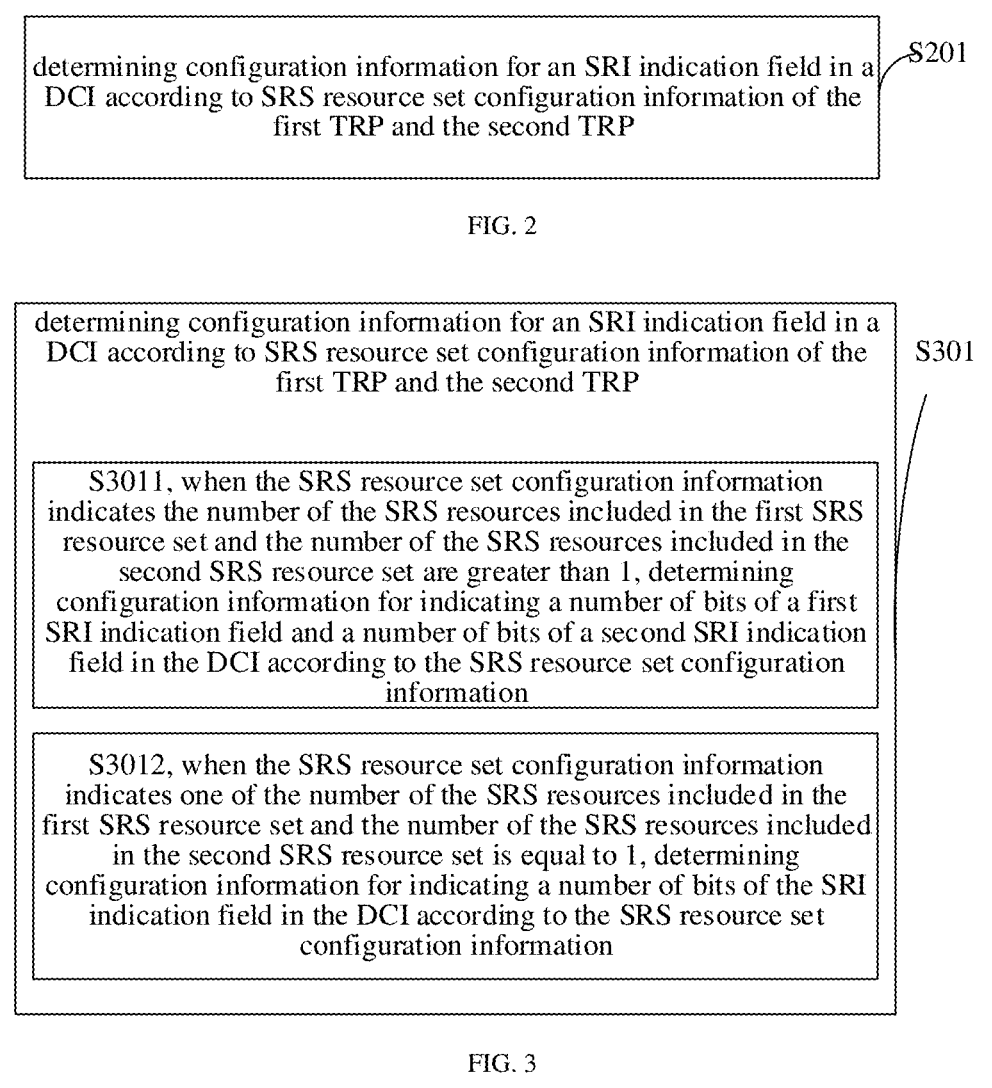

S201

FIG. 2 determining configuration information for an SRI indication field in a DCI according to SRS resource set configuration information of the first TRP and the second TRP

S301

S3011, when the SRS resource set configuration information indicates the number of the SRS resources included in the first SRS resource set and the number of the SRS resources included in the second SRS resource set are greater than 1, determining configuration information for indicating a number of bits of a first SRI indication field and a number of bits of a second SRI indication field in the DCI according to the SRS resource set configuration information S3012, when the SRS resource set configuration information indicates one of the number of the SRS resources included in the first SRS resource set and the number of the SRS resources included in the second SRS resource set is equal to 1, determining configuration information for indicating a number of bits of the SRI indication field in the DCI according to the SRS resource set configuration information

FIG. 3 determining configuration information for an SRI indication field in a DCI according to SRS resource set configuration information of the first TRP and the second TRP

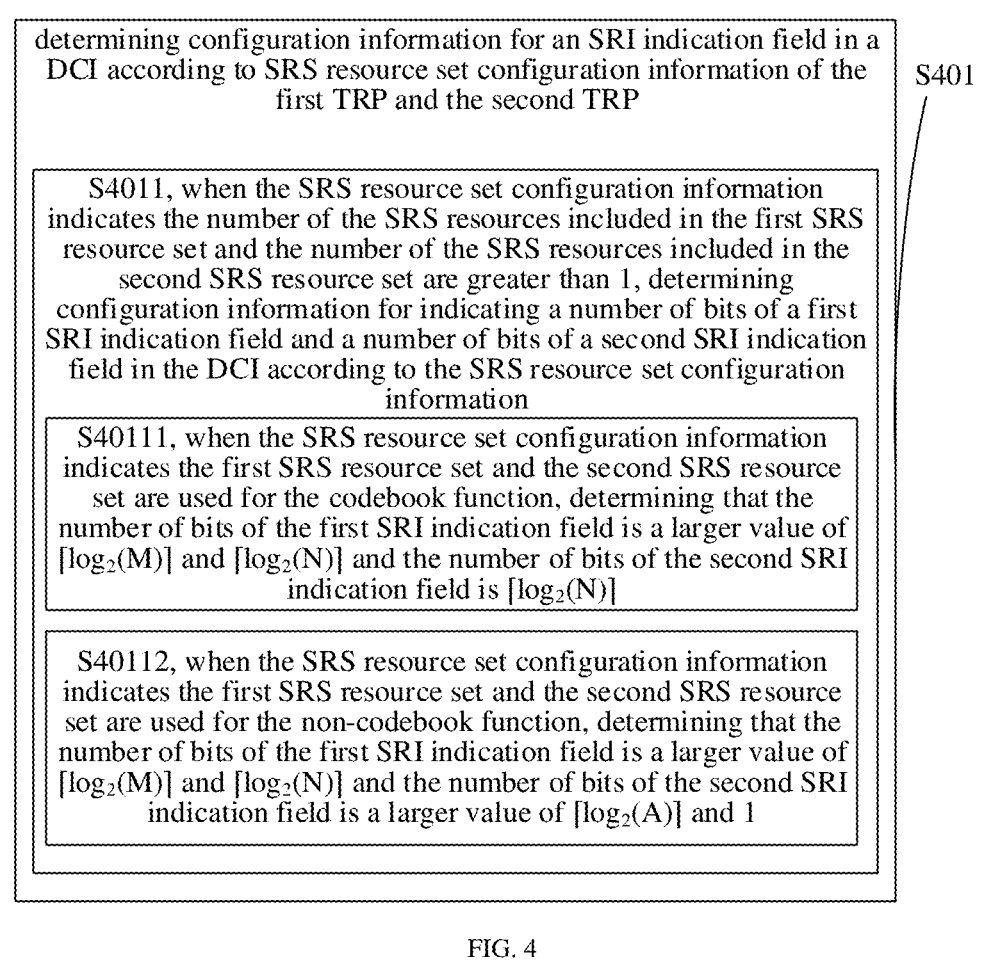

S401

S4011, when the SRS resource set configuration information indicates the number of the SRS resources included in the first SRS resource set and the number of the SRS resources included in the second SRS resource set are greater than 1, determining configuration information for indicating a number of bits of a first SRI indication field and a number of bits of a second SRI indication field in the DCI according to the SRS resource set configuration information S40111, when the SRS resource set configuration information indicates the first SRS resource set and the second SRS resource set are used for the codebook function, determining that the number of bits of the first SRI indication field is a larger value of $\lceil \log_2(M) \rceil$ and $\lceil \log_2(N) \rceil$ and the number of bits of the second SRI indication field is $\lceil \log_2(N) \rceil$ S40112, when the SRS resource set configuration information indicates the first SRS resource set and the second SRS resource set are used for the non-codebook function, determining that the number of bits of the first SRI indication field is a larger value of $\lceil \log_2(M) \rceil$ and $\lceil \log_2(N) \rceil$ and the number of bits of the second SRI indication field is a larger value of $\lceil \log_2(A) \rceil$ and 1

FIG. 4

| index mapped by bit field | SRI, $N_{SRS} = 2$ | index mapped by bit field | SRI, $N_{SRS} = 3$ | index mapped by bit field | SRI, $N_{SRS} = 4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | Reserved | 3 | 0,1 | 3 | 3 |
| | | 4 | 0,2 | 4 | 0,1 |
| | | 5 | 1,2 | 5 | 0,2 |
| | | 6-7 | Reserved | 6 | 0,3 |
| | | | | 7 | 1,2 |
| | | | | 8 | 1,3 |
| | | | | 9 | 2,3 |
| | | | | 10-15 | Reserved |

FIG. 5 determining configuration information for an SRI indication field in a DCI according to SRS resource set configuration information of the first TRP and the second TRP

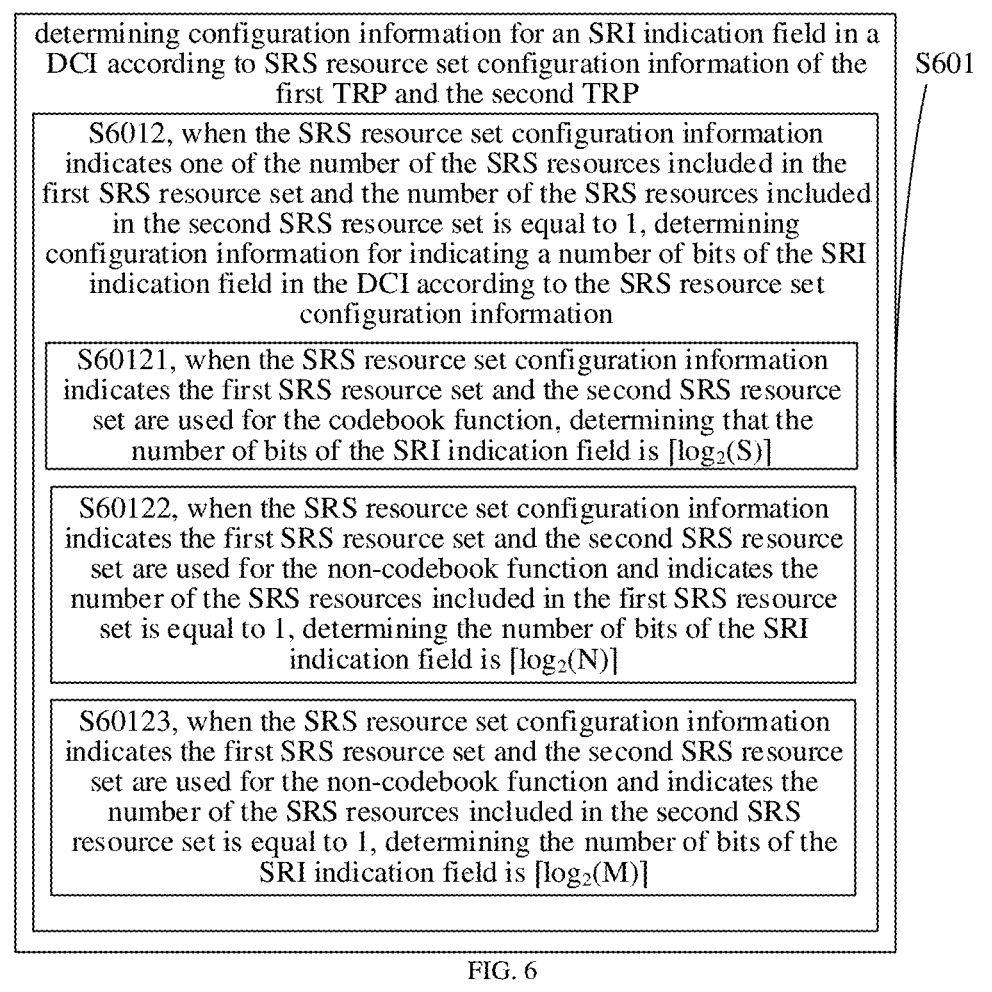

S601

S6012, when the SRS resource set configuration information indicates one of the number of the SRS resources included in the first SRS resource set and the number of the SRS resources included in the second SRS resource set is equal to 1, determining configuration information for indicating a number of bits of the SRI indication field in the DCI according to the SRS resource set configuration information S60121, when the SRS resource set configuration information indicates the first SRS resource set and the second SRS resource set are used for the codebook function, determining that the number of bits of the SRI indication field is $\lceil \log_2(S) \rceil$ S60122, when the SRS resource set configuration information indicates the first SRS resource set and the second SRS resource set are used for the non-codebook function and indicates the number of the SRS resources included in the first SRS resource set is equal to 1, determining the number of bits of the SRI indication field is $\lceil \log_2(N) \rceil$ S60123, when the SRS resource set configuration information indicates the first SRS resource set and the second SRS resource set are used for the non-codebook function and indicates the number of the SRS resources included in the second SRS resource set is equal to 1, determining the number of bits of the SRI indication field is $\lceil \log_2(M) \rceil$

FIG. 6

TRANSMISSION CONFIGURATION METHOD AND APPARATUS FOR MULTIPLE TRANSMISSION AND RECEPTION POINTS (TRPs)

CROSS-REFERENCE TO RELATED APPLICATION

This application is a US national phase application of International Application No. PCT/CN2021/121719, filed on Sep. 29, 2021, the entire content of which is incorporated herein by reference.

TECHNICAL FIELD

The disclosure relates to the field of mobile communication technologies, and particularly to a method and an apparatus for transmission configuration for multiple transmission reception points (TRPs).

BACKGROUND

A sounding reference signal (SRS) as an uplink reference signal may be used for channel quality detection and estimation, beam management, etc. A user equipment (UE) may be configured with one or more SRS resource sets and each SRS resource set at least includes one SRS resource. When the UE is configured with multiple SRS resources, a base station may transmit an SRS resource indicator (SRI) to the UE to indicate an SRS resource corresponding to a beam selected by the base station.

SUMMARY

A method for transmission configuration for multiple TRPs is provided according to a first aspect of the disclosure. The method is performed by a network device. The multiple TRPs include a first TRP and a second TRP. The method includes: determining configuration information for an SRI indication field in downlink control information (DCI) according to SRS resource set configuration information of the first TRP and the second TRP; in which the SRS resource set configuration information indicates a number of SRS resources included in a first SRS resource set corresponding to the first TRP and a number of SRS resources included in a second SRS resource set corresponding to the second TRP, and indicates whether the first SRS resource set and the second SRS resource set are used for a codebook function or a non-codebook function.

A communication device is provided according to a second aspect of the disclosure. The device includes: a transceiver, a memory storing computer executable instructions, and a processor configured to perform: determining configuration information for an SRI indication field in a DCI according to SRS resource set configuration information of the first TRP and the second TRP; in which the SRS resource set configuration information indicates a number of SRS resources included in a first SRS resource set corresponding to the first TRP and a number of SRS resources included in a second SRS resource set corresponding to the second TRP, and indicates whether the first SRS resource set and the second SRS resource set are used for a codebook function or a non-codebook function.

A non-transitory computer storage medium storing computer executable instructions is provided according to a third aspect of the disclosure, in which when the computer executable instructions are executed by a processor of a communication device, the method for transmission configuration for multiple TRPs according to the first aspect of is performed.

BRIEF DESCRIPTION OF THE DRAWINGS

The above and/or additional aspects and advantages of the disclosure will become obvious and easy to understand from the following descriptions of the embodiments in conjunction with the accompanying drawings, in which:

FIG. 2 is a flowchart illustrating a method for transmission configuration for multiple TRPs according to embodiments of the disclosure.

FIG. 3 is a flowchart illustrating a method for transmission configuration for multiple TRPs according to embodiments of the disclosure.

FIG. 4 is a flowchart illustrating a method for transmission configuration for multiple TRPs according to embodiments of the disclosure.

FIG. 5 is a diagram illustrating a pre-configured SRI table according to embodiments of the disclosure.

FIG. 6 is a flowchart illustrating a method for transmission configuration for multiple TRPs according to embodiments of the disclosure.

DETAILED DESCRIPTION

Figure 1:
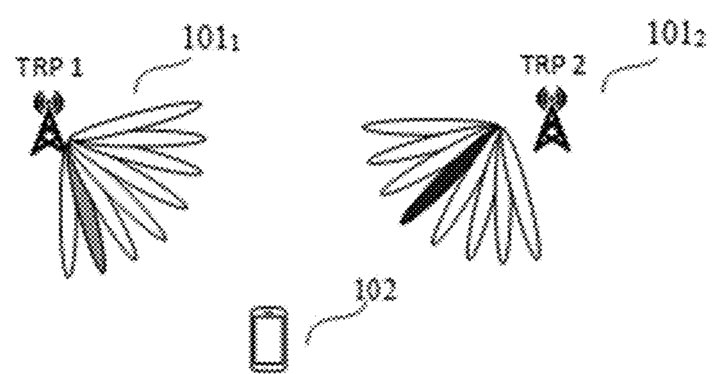
FIG. 1 is a diagram illustrating an architecture of a communication system according to embodiments of the disclosure.

Reference will now be made in detail to embodiments of the disclosure, examples of which are illustrated in the accompanying drawings in which the same or similar elements and elements having the same or similar functions are denoted by like reference numerals throughout the descriptions. Embodiments described herein with reference to the drawings are explanatory, serve to explain the disclosure, and are not construed to limit the disclosure.

In order to understand the method and the apparatus for transmission configuration for multiple TRPs according to embodiments of the disclosure better, a communication system to which embodiments of the disclosure are applicable is described below.

Referring to FIG. 1, FIG. 1 is a diagram illustrating an architecture of a communication system according to embodiments of the disclosure. The communication system may include, but is not limited to, a network device and a terminal device. The number and the form of each device in FIG. 1 are only for example and do not constitute a limitation to embodiments of the disclosure. Two or more network devices and two or more terminal devices may be included in practical applications. The communication system 100 as illustrated in FIG. 1 includes network device $\mathbf{101}_1$ as TRP1, network device $\mathbf{101}_2$ as TRP2, and user equipment (UE) 102 for example. It should be noted that, although one network includes one TRP as illustrated in FIG. 1, in actual application, one network device may include one or more TRPs.

It should be noted that technical solutions according to embodiments of the disclosure may be applicable to various communication systems. For example, a long term evolution (LTE) system, a 5th generation (5G) mobile communication system, a 5G new radio (NR) system, or other future new mobile communication systems.

The network device 101 according to embodiments of the disclosure is an entity on the network side for transmitting or receiving signals. For example, the network device 101 may be an evolved NodeB (eNB), a transmission reception point (TRP), a next generation NodeB (gNB) in a NR system, a base station in other future mobile communication systems, or an access node in a wireless fidelity (WiFi™) system. The embodiments of the disclosure do not limit the specific technology and specific device form adopted by the network device. The network device according to embodiments of the disclosure may include a central unit (CU) and a distributed unit (DU). The CU may also be referred to as a control unit. By adopting a CU-DU structure, protocol layers of the network device such as the base station may be splitted, functions of some protocol layers are centrally controlled by the CU, functions of the remaining part or all the protocol layers are distributed in the DU, and the CU centrally controls the DU.

The UE 102 according to embodiments of the disclosure is an entity on the user side for transmitting or receiving signals, such as a mobile phone. The UE may also be referred to as a terminal, a mobile station (MS), a mobile terminal (MT), or the like. The UE may be a car with a communication function, a smart car, a mobile phone, a wearable device, a tablet computer (Pad), a computer with a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, or the like. The embodiments of the disclosure do not limit the specific technology and specific device form adopted by the UE.

It should be understood that the communication system described according to the embodiments of the disclosure is for the purpose of illustrating the technical solutions according to the embodiments of the disclosure more clearly and does not constitute a limitation on the technical solutions according to the embodiments of the disclosure. For those skilled in the art, with the evolution of the system architecture and the emergence of the new service scenario, the technical solutions according to the embodiments of the disclosure are also applicable to similar technical problems.

A sounding reference signal (SRS) as an uplink reference signal may be used for channel quality detection and estimation, beam management, etc. A UE may be configured with one or more SRS resource sets and each SRS resource set at least includes one SRS resource. When the UE is configured with multiple SRS resources, a base station may transmit an SRS resource indicator (SRI) to the UE to indicate an SRS resource corresponding to a beam selected by the base station.

In a next generation mobile communication network, an ultra high rate is a critical requirement. The base station configures multiple TRPs to meet the ultra high rate requirement to a certain extent. In a scenario where the base station configures the multiple TRPs, SRS resource sets are associated with different TRPs, which is configured to the UE via a radio resource control (RRC) signaling.

However, in the scenario where the base station configures the multiple TRPs, only an association relationship between an SRI indication field in downlink control information (DCI) and an SRS resource set is defined, and a specific configuration solution of the SRI indication field is not defined.

For this purpose, a method and an apparatus for transmission configuration for multiple TRPs are provided according to the disclosure, which may provide a solution for configuring an SRI indication field included in a DCI in a multi-TRP scenario, thereby remedying the deficiency in the related art.

The method and the apparatus for transmission configuration for multiple TRPs according to the disclosure are described in combination with the accompanying drawings.

FIG. 2 illustrates a flowchart of a method for transmission configuration for multiple TRPs according to embodiments of the disclosure. According to embodiments, the method is performed by a network device. The multiple TRPs include a first TRP and a second TRP. As illustrated in FIG. 2, the method for transmission configuration for multiple TRPs includes the following step.

At S201, configuration information for an SRI indication field in a DCI is determined according to SRS resource set configuration information of the first TRP and the second TRP.

The SRS resource set configuration information indicates a number of SRS resources included in a first SRS resource set corresponding to the first TRP and a number of SRS resources included in a second SRS resource set corresponding to the second TRP, and indicates whether the first SRS resource set and the second SRS resource set are used for a codebook function or a non-codebook function.

According to embodiments, in a multi-TRP scenario including the first TRP and the second TRP, the network device determines the configuration solution of the SRI indication field according to the SRS resource set configuration information of the multiple TRPs. The SRS resource set configuration information of the multiple TRPs may indicate the number of SRS resources included in the SRS resource set corresponding to each TRP as well as whether the SRS resource set corresponding to each TRP is used for the codebook function or the non-codebook function. In a codebook-based uplink transmission, the SRS resource set is used for the codebook function, and in a non-codebook-based uplink transmission, the SRS resource set is used for the non-codebook function.

The method according to the disclosure is applicable to a grant PUSCH transmission and a grant free PUSCH transmission, that is, the configuration solution of the SRI indication field in the grant PUSCH transmission and the grant free PUSCH transmission may be determined according to the method according to the embodiments.

According to the method for transmission configuration for multiple TRPs according to embodiments of the disclosure, the network device determines the configuration information for the SRI indication field in the DCI according to the number of the SRS resources included in the SRS resource set corresponding to each of the first TRP and the second TRP as well as whether the SRS resource set corresponding to each of the first TRP and the second TRP is used for the codebook function or the non-codebook function, thereby providing a solution for configuring an SRI indication field, suitable for a multi-TRP scenario, which remedies the deficiency in the related art.

FIG. 3 illustrates a flowchart of a method for transmission configuration for multiple TRPs according to embodiments of the disclosure. According to embodiments, the method is performed by a network device. The multiple TRPs include a first TRP and a second TRP. As illustrated in FIG. 3, the method for transmission configuration for multiple TRPs includes the following steps.

At S301, configuration information for an SRI indication field in a DCI is determined according to SRS resource set configuration information of the first TRP and the second TRP.

The SRS resource set configuration information indicates a number of SRS resources included in a first SRS resource set corresponding to the first TRP and a number of SRS resources included in a second SRS resource set corresponding to the second TRP, and indicates whether the first SRS resource set and the second SRS resource set are used for a codebook function or a non-codebook function.

The descriptions of the above step S301 may refer to the descriptions of step 201 and relevant details, which will not be repeated herein.

The SRS resource set configuration information may indicate the number of the SRS resources included in the SRS resource set corresponding to each TRP.

When the number of the SRS resources included in the SRS resource set corresponding to a certain TRP is 1, since only a single SRS resource is applicable to the TRP, a selected SRS resource does not need to be indicated for the TRP, that is, only when the SRS resource set corresponding to the certain TRP includes more than one SRS resource, it needs to indicate which SRS resource in the SRS resources is used for the TRP.

Therefore, whether the number of the SRS resources included in the SRS resource set corresponding to each TRP is greater than 1, may affect how to determine the configuration information for the SRI indication field in the DCI.

According to some embodiments, the above step S301 may include any following step.

At S3011, when the SRS resource set configuration information indicates the number of the SRS resources included in the first SRS resource set and the number of the SRS resources included in the second SRS resource set are greater than 1, configuration information for indicating a number of bits of a first SRI indication field and a number of bits of a second SRI indication field in the DCI is determined according to the SRS resource set configuration information. The first SRI indication field is configured to indicate a selected SRS resource for the first TRP, and the second SRI indication field is configured to indicate a selected SRS resource for the second TRP.

In the disclosure, when the number of the SRS resources included in the first SRS resource set corresponding to the first TRP and the number of the SRS resources included in the second SRS resource set corresponding to the second TRP are greater than 1, which SRS resource in the SRS resources is selected needs to be indicated for the first TRP and which SRS resource in the SRS resources is selected needs to be indicated for the second TRP. Therefore, the first SRI indication field and the second SRI indication field may be included in the DCI and are respectively used to indicate the selected SRS resource for the first TRP and the selected SRS resource for the second TRP. In this case, determining the configuration information of the SRI indication field in the DCI includes determining configuration information of the first SRI indication field, for example, a number of occupied bits, and determining configuration information of the second SRI indication field, for example, a number of occupied bits.

At S3012, when the SRS resource set configuration information indicates one of the number of the SRS resources included in the first SRS resource set and the number of the SRS resources included in the second SRS resource set is equal to 1, configuration information for indicating a number of bits of the SRI indication field in the DCI is determined according to the SRS resource set configuration information. The SRI indication field is configured to indicate a selected SRS resource for a TRP in the first TRP and the second TRP, corresponding to an SRS resource set including more than one SRS resource.

According to embodiments, when one of the number of the SRS resources included in the first SRS resource set corresponding to the first TRP and the number of the SRS resources included in the second SRS resource set corresponding to the second TRP is equal to 1, which SRS resource in the SRS resources is selected needs to be indicated only for the TRP in the first TRP and the second TRP and for the TRP corresponding to the SRS resource set including more than one SRS resource. Therefore, an SRI indication field may be included in the DCI and is configured to indicate the selected SRS resource for the TRP in the first TRP and the second TRP and for the TRP corresponding to the SRS resource set including more than one SRS resource. In this case, determining the configuration information of the SRI indication field in the DCI includes determining the configuration information of the SRI indication field, for example, a number of occupied bits.

For example, when the number of the SRS resources included in the first SRS resource set is 1, the selected SRS resource needs to be indicated only for the second TRP without necessarily for the first TRP, that is, the DCI may only include a single SRI indication field for indicating the SRS resource selected for the second TRP. When the number of the SRS resources included in the second SRS resource set is 1, the selected SRS resource needs to be indicated only for the first TRP without necessarily for the second TRP, that is, the DCI may only include a single SRI indication field for indicating the SRS resource selected for the first TRP.

The method according to the disclosure is applicable to a grant PUSCH transmission and a grant free PUSCH transmission, that is, the configuration solution of the SRI indication field in the grant PUSCH transmission and the grant free PUSCH transmission may be determined according to the method according to the embodiments.

According to the method for transmission configuration for multiple TRPs according to embodiments of the disclosure, the network device determines the configuration information for the SRI indication field in the DCI according to the number of the SRS resources included in the SRS resource set corresponding to each of the first TRP and the second TRP as well as whether the SRS resource set corresponding to each of the first TRP and the second TRP is used for the codebook function or the non-codebook function. In detail, the configuration information for the SRI indication field required in the DCI is determined according to whether the number of the SRS resources included in the first SRS resource set and the number of the SRS resources included in the second SRS resource set are equal to 1, thereby providing a solution for configuring an SRI indication field, suitable for a multi-TRP scenario, which remedies the deficiency in the related art.

FIG. 4 illustrates a flowchart of a method for transmission configuration for multiple TRPs according to embodiments of the disclosure. According to embodiments, the method is performed by a network device. The multiple TRPs include a first TRP and a second TRP. Based on embodiments as illustrated in FIG. 3, as illustrated in FIG. 4, the method for transmission configuration for multiple TRPs includes the following steps.

At S401, configuration information for an SRI indication field in a DCI is determined according to SRS resource set configuration information of the first TRP and the second TRP.

The SRS resource set configuration information indicates a number of SRS resources included in a first SRS resource set corresponding to the first TRP and a number of SRS resources included in a second SRS resource set corresponding to the second TRP, and indicates whether the first SRS resource set and the second SRS resource set are used for a codebook function or a non-codebook function.

The descriptions of the above step S401 may refer to the descriptions of step 201 and relevant details, which will not be repeated herein.

According to some embodiments, the above step S401 may include the following steps.

At S4011, when the SRS resource set configuration information indicates the number of the SRS resources included in the first SRS resource set and the number of the SRS resources included in the second SRS resource set are greater than 1, configuration information for indicating a number of bits of a first SRI indication field and a number of bits of a second SRI indication field in the DCI is determined according to the SRS resource set configuration information. The first SRI indication field is configured to indicate a selected SRS resource for the first TRP, and the second SRI indication field is configured to indicate a selected SRS resource for the second TRP.

The descriptions of the above step S4011 may refer to the descriptions of step S3011 and relevant details, which will not be repeated herein.

The SRS resource set configuration information may further indicate whether the SRS resource set corresponding to each TRP is used for the codebook function or the non-codebook function in addition to indicating the number of the SRS resources included in the SRS resource set corresponding to each TRP.

In a codebook-based uplink transmission, the UE usually transmits a non-precoded SRS to detect an uplink channel, and the network device determines a preferred precoder from the codebook according to the SRS channel estimation. When the UE is configured with multiple SRS resources, the network device may feed back the SRI to indicate the selected SRS resource, and notify a transmitted precoding matrix indicator (TPMI) for indicating the selected precoder and a rank indication (RI) for indicating a number of transmission layers to the UE simultaneously, and the UE performs precoding using the TPMI and the RI specified by the network device in a subsequent uplink data transmission, and maps precoded data to a corresponding antenna port according to a spatial filter corresponding to the SRI resource indicated by the SRI. In a non-codebook-based uplink transmission, the UE itself determines one or more available precoders, and precodes one or more SRSs in one or more SRS resources using the available precoders, and the network device correspondingly determines one or more preferred SRS resources, and uses the SRI to indicate the UE to use a precoder for precoding the one or more preferred SRS resources. In a multi-TRP-based PUSCH collaborative transmission, regardless of the codebook-based transmission or the non-codebook-based transmission, the collaborative transmission of maximum two TRPs is currently supported, and an associated SRS resource set is configured for each TRP simultaneously and is respectively indicated by an independent SRI field.

Whether the SRS resource set corresponding to each TRP is used for the codebook function or the non-codebook function may affect how to determine the configuration information for the SRI indication field in the DCI.

According to some embodiments, the above step S4011 may include any following step.

At S40111, when the SRS resource set configuration information indicates the first SRS resource set and the second SRS resource set are used for the codebook function, it is determined that the number of bits of the first SRI indication field is a larger value of $\lceil \log_2(M) \rceil$ and $\lceil \log_2(N) \rceil$ and the number of bits of the second SRI indication field is $\lceil \log_2(N) \rceil$. M is the number of the SRS resources included in the first SRS resource set, N is the number of the SRS resources included in the second SRS resource set, and $\lceil\ \rceil$ represents round up.

According to embodiments, when the first SRS resource set corresponding to the first TRP and the second SRS resource set corresponding to the second TRP are used for the codebook function, that is, in the codebook-based uplink transmission, the number of bits of the first SRI indication field may be determined according to the larger number of the number of the SRS resources included in the first SRS resource set and the number of the SRS resources included in the second SRS resource set, and the number of bits of the second SRI indication field is determined according to the number of the SRS resources included in the second SRS resource set.

For example, suppose the number of the SRS resources included in the first SRS resource set is M, and the number of the SRS resources included in the second SRS resource set is N, the number of bits of the second SRI indication field may be determined as $\lceil \log_2(N) \rceil$, and the number of bits of the first SRI indication field may be determined as $\max(\lceil \log_2(M) \rceil, \lceil \log_2(N) \rceil)$, that is, when M>N, the number of bits of the first SRI indication field may be determined as $\lceil \log_2(M) \rceil$, when M<N, the number of bits of the first SRI indication field may be determined as $\lceil \log_2(N) \rceil$, and when M=N, the number of bits of the first SRI indication field may be determined as any one of $\lceil \log_2(M) \rceil$ and $\lceil \log_2(N) \rceil$.

At S40112, when the SRS resource set configuration information indicates the first SRS resource set and the second SRS resource set are used for the non-codebook function, it is determined that the number of bits of the first SRI indication field is a larger value of $\lceil \log_2(M) \rceil$ and $\lceil \log_2(N) \rceil$ and the number of bits of the second SRI indication field is a larger value of $\lceil \log_2(A) \rceil$ and 1. M is the number of the SRS resources included in the first SRS resource set, A is a number of entries with a rank being X in a pre-configured SRI table, X is a rank determined according to the first SRI indication field, and $\lceil\ \rceil$ represents round up.

According to embodiments, when the first SRS resource set corresponding to the first TRP and the second SRS resource set corresponding to the second TRP are used for the non-codebook function, that is, in the non-codebook-based uplink transmission, the number of bits of the first SRI indication field may be determined according to the larger number of the number of the SRS resources included in the first SRS resource set and the number of the SRS resources included in the second SRS resource set, and the number of bits of the second SRI indication field may be determined according to the pre-configured SRI table and the first SRI indication field. The pre-configured SRI table is pre-configured in the network device.

For example, suppose the number of the SRS resources included in the first SRS resource set is M, and the number of the SRS resources included in the second SRS resource set is N, the number of bits of the first SRI indication field may be determined as $\max(\lceil \log_2(M) \rceil, \lceil \log_2(N) \rceil)$, that is, when M>N, the number of bits of the first SRI indication field may be determined as $\lceil \log_2(M) \rceil$, when M<N, the number of bits of the first SRI indication field may be determined as $\lceil \log_2(N) \rceil$, and when M=N, the number of bits of the first SRI indication field may be determined as any one of $\lceil \log_2(M) \rceil$ and $\lceil \log_2(N) \rceil$; and the number of bits of the second SRI indication field may be determined as $\max(\lceil \log_2(A) \rceil, 1)$, A is a number of entries with a rank being X in a pre-configured SRI table, and X is a rank determined according to the first SRI indication field, that is, when A>1, the number of bits of the second SRI indication field may be determined as $\lceil \log_2(A) \rceil$, and if A=1, the number of bits of the second SRI indication field may be determined as 1. Since the first SRS resource set and the second SRS resource set correspond to the same number of transmission layers, the second SRI indication field for indicating the selected SRS resource for the second TRP only needs to be capable of indicating an SRS resource option corresponding to a rank determined by the first SRI indication field, without necessarily indicating all SRS resource options, thereby saving a number of required bits of the SRI indication field.

For example, FIG. 5 illustrates a pre-configured SRI table. The pre-configured SRI table is applicable to a scenario of a maximum number of transmission layers $L_{max}=2$, and illustrates an RS case where a number of available SRS resources is respectively 2 ($N_{SRS}=2$), 3 ($N_{SRS}=3$) and 4 ($N_{SRS}=4$).

As illustrated in FIG. 5, for example, when $N_{SRS}=2$, that is, there are two SRS resources, since $L_{max}=2$, there may be three representations: selecting a first SRS resource (indicated by 0), selecting a second SRS resource (indicated by 1), and selecting a first SRS resource and a second SRS resource (indicated by 0, 1). In this case, there are two entries with a rank being 1, that is, two entries respectively indicated by 0 and indicated by 1; and there is one entry with a rank being 2, that is, one entry indicated by 0, 1. When the first SRI indication field indicates (0), the rank is 1, and corresponds to a number of entries A=2, and a number of bits of the second SRI indication field is $\max(\lceil \log_2(2) \rceil, 1)=1$; when the first SRI indication field indicates (0, 1), the rank is 2, and corresponds to a number of entries A=1, and a number of bits of the second SRI indication field is $\max(\lceil \log_2(1) \rceil, 1)=1$.

For example, when $N_{SRS}=4$, that is, there are four SRS resources, since $L_{max}=2$, there may be ten representations: selecting a first SRS resource (indicated by 0), selecting a second SRS resource (indicated by 1), selecting a third SRS resource (indicated by 2), selecting a fourth SRS resource (indicated by 3), selecting a first SRS resource and a second SRS resource (indicated by 0, 1), selecting a first SRS resource and a third SRS resource (indicated by 0, 2), selecting a first SRS resource and a fourth SRS resource (indicated by 0, 3), selecting a second SRS resource and a third SRS resource (indicated by 1, 2), selecting a second SRS resource and a fourth SRS resource (indicated by 1, 3), and selecting a third SRS resource and a fourth SRS resource (indicated by 2, 3). In this case, there are four entries with a rank being 1, that is, four entries respectively indicated by 0, 1, 2, and 3; there are six entries with a rank being 2, that is, six entries respectively indicated by 0, 1, by 0, 2, by 0, 3, by 1, 2, by 1, 3, and by 2, 3. When the first SRI indication field indicates (0), the rank is 1, and corresponds to a number of entries A=4, and a number of bits of the second SRI indication field is $\max(\lceil \log_2(4) \rceil, 1)=2$; when the first SRI indication field indicates (0, 1), the rank is 2, and corresponds to a number of entries A=6, and a number of bits of the second SRI indication field is $\max(\lceil \log_2(6) \rceil, 1)=3$.

The method according to the disclosure is applicable to a grant PUSCH transmission and a grant free PUSCH transmission, that is, the configuration solution of the SRI indication field in the grant PUSCH transmission and the grant free PUSCH transmission may be determined according to the method according to the embodiments.

According to the method for transmission configuration for multiple TRPs according to embodiments of the disclosure, the network device determines the configuration information for the SRI indication field in the DCI according to the number of the SRS resources included in the SRS resource set corresponding to each of the first TRP and the second TRP as well as whether the SRS resource set corresponding to each of the first TRP and the second TRP is used for the codebook function or the non-codebook function. In detail, when the number of the SRS resources included in the SRS resource set corresponding to each of the first TRP and the second TRP is greater than 1, the configuration information for the SRI indication fields for respectively indicating the selected SRS resources for the first TRP and the second TRP in the DCI is determined according to whether the SRS resource set is used for the codebook function or the non-codebook function, thereby providing a solution for configuring an SRI indication field, suitable for a multi-TRP scenario, which remedies the deficiency in the related art.

FIG. 6 illustrates a flowchart of a method for transmission configuration for multiple TRPs according to embodiments of the disclosure. According to embodiments, the method is performed by a network device. The multiple TRPs include a first TRP and a second TRP. Based on embodiments as illustrated in FIG. 3, as illustrated in FIG. 6, the method for transmission configuration for multiple TRPs includes the following steps.

At S601, configuration information for an SRI indication field in a DCI is determined according to SRS resource set configuration information of the first TRP and the second TRP.

The SRS resource set configuration information indicates a number of SRS resources included in a first SRS resource set corresponding to the first TRP and a number of SRS resources included in a second SRS resource set corresponding to the second TRP, and indicates whether the first SRS resource set and the second SRS resource set are used for a codebook function or a non-codebook function.

The descriptions of the above step S601 may refer to the descriptions of step S201 and relevant details, which will not be repeated herein.

According to some embodiments, the above step S601 may include the following steps.

At S6012, when the SRS resource set configuration information indicates one of the number of the SRS resources included in the first SRS resource set and the number of the SRS resources included in the second SRS resource set is equal to 1, configuration information for indicating a number of bits of the SRI indication field in the DCI is determined according to the SRS resource set configuration information. The SRI indication field is configured to indicate a selected SRS resource for a TRP in the first TRP and the second TRP, corresponding to an SRS resource set including more than one SRS resource.

The descriptions of the above step S6012 may refer to the descriptions of step S3012 and relevant details, which will not be repeated herein.

The SRS resource set configuration information may further indicate whether the SRS resource set corresponding to each TRP is used for the codebook function or the non-codebook function in addition to indicating the number of the SRS resources included in the SRS resource set corresponding to each TRP.

In a codebook-based uplink transmission, the UE usually transmits a non-precoded SRS to detect an uplink channel, and the network device determines a preferred precoder from the codebook according to the SRS channel estimation. When the UE is configured with multiple SRS resources, the network device may feed back the SRI to indicate the selected SRS resource, and notify a TPMI for indicating the selected precoder and an RI for indicating a number of transmission layers to the UE simultaneously, and the UE performs precoding using the TPMI and the RI specified by the network device in a subsequent uplink data transmission, and maps precoded data to a corresponding antenna port according to a spatial filter corresponding to the SRI resource indicated by the SRI. In a non-codebook-based uplink transmission, the UE itself determines one or more available precoders, and precodes one or more SRSs in one or more SRS resources using the available precoders, and the network device correspondingly determines one or more preferred SRS resources, and uses the SRI to indicate the UE to use a precoder for precoding the one or more preferred SRS resources. In a multi-TRP-based PUSCH collaborative transmission, regardless of the codebook-based transmission or the non-codebook-based transmission, the collaborative transmission of maximum two TRPs is currently supported, and an associated SRS resource set is configured for each TRP simultaneously and is respectively indicated by an independent SRI field.

Whether the SRS resource set corresponding to each TRP is used for the codebook function or the non-codebook function may affect how to determine the configuration information for the SRI indication field in the DCI.

According to some embodiments, the above step S6012 may include any following step.

At S60121, when the SRS resource set configuration information indicates the first SRS resource set and the second SRS resource set are used for the codebook function, it is determined that the number of bits of the SRI indication field is $\lceil \log_2(S) \rceil$. S is another one of the number of the SRS resources included in the first SRS resource set and the number of the SRS resources included in the second SRS resource set, which is not equal to 1, and $\lceil\ \rceil$ represents round up.

According to embodiments, when the first SRS resource set corresponding to the first TRP and the second SRS resource set corresponding to the second TRP are used for the codebook function, that is, in the codebook-based uplink transmission, the number of bits of the SRI indication field may be determined according to one of the number of the SRS resources included in the first SRS resource set and the number of the SRS resources included in the second SRS resource set, not equal to 1.

For example, suppose that the number of the SRS resources included in the first SRS resource set is M, and the number of the SRS resources included in the second SRS resource set is N, when M=1, the number of bits of the SRI indication field may be determined as $\lceil \log_2(N) \rceil$; and when N=1, the number of bits of the SRI indication field may be determined as $\lceil \log_2(M) \rceil$.

At S60122, when the SRS resource set configuration information indicates the first SRS resource set and the second SRS resource set are used for the non-codebook function and indicates the number of the SRS resources included in the first SRS resource set is equal to 1, it is determined that the number of bits of the SRI indication field is $\lceil \log_2(N) \rceil$. N is the number of the SRS resources included in the second SRS resource set. Or, it is determined that the number of bits of the SRI indication field is determined as a larger value of $\lceil \log_2(A) \rceil$ and 1. A is a number of entries with a rank being 1 in a pre-configured SRI table, and $\lceil\ \rceil$ represents round up.

According to embodiments, when the first SRS resource set corresponding to the first TRP and the second SRS resource set corresponding to the second TRP are used for the non-codebook function, that is, in the non-codebook-based uplink transmission, if the number of the SRS resources included in the first SRS resource set is equal to 1, the number of bits of the SRI indication field may be determined according to the number of the SRS resources included in the second SRS resource set or the pre-configured SRI table. The pre-configured SRI table is pre-configured in the network device.

In an example, suppose that the number of the SRS resources included in the first SRS resource set is M=1, and the number of the SRS resources included in the second SRS resource set is N, the number of bits of the SRI indication field may be determined as $\lceil \log_2(N) \rceil$.

In another example, suppose that the number of the SRS resources included in the first SRS resource set is M=1, and the number of the SRS resources included in the second SRS resource set is N, the number of bits of the SRI indication field may be determined as $\max(\lceil \log_2(A) \rceil, 1)$, and A is a number of entries with a rank being 1 in a pre-configured SRI table, that is, when A>1, the number of bits of the SRI indication field may be determined as $\lceil \log_2(A) \rceil$, and when A=1, the number of bits of the SRI indication field may be determined as 1. Therefore, A is an integer greater than or equal to 1. Since the number of the SRS resources included in the first SRS resource set is M=1, and the first SRS resource set and the second SRS resource set correspond to the same number of transmission layers, that is, 1, the SRI indication field for indicating the selected SRS resource for the second TRP only needs to be capable of indicating an SRS resource option with a rank being 1, without necessarily indicating all SRS resource options, thereby saving a number of required bits of the SRI indication field.

For example, as illustrated in FIG. 5, for example, when $N_{SRS}$=2, that is, there are two SRS resources, since $L_{max}$=2, there may be three representations: selecting a first SRS resource (indicated by 0), selecting a second SRS resource (indicated by 1), and selecting a first SRS resource and a second SRS resource (indicated by 0, 1). In this case, there are two entries with a rank being 1, that is, two entries respectively indicated by 0 and indicated by 1, that is, A=2, and a number of bits of the SRI indication field is $\max(\lceil \log_2(2) \rceil, 1)=1$.

For example, when $N_{SRS}$=4, that is, there are four SRS resources, since $L_{max}$=2, there may be ten representations: selecting a first SRS resource (indicated by 0), selecting a second SRS resource (indicated by 1), selecting a third SRS resource (indicated by 2), selecting a fourth SRS resource (indicated by 3), selecting a first SRS resource and a second SRS resource (indicated by 0, 1), selecting a first SRS resource and a third SRS resource (indicated by 0, 2), selecting a first SRS resource and a fourth SRS resource (indicated by 0, 3), selecting a second SRS resource and a third SRS resource (indicated by 1, 2), selecting a second SRS resource and a fourth SRS resource (indicated by 1, 3), and selecting a third SRS resource and a fourth SRS resource (indicated by 2, 3). In this case, there are four entries with a rank being 1, that is, four entries respectively indicated by 0, indicated by 1, indicated by 2 and indicated by 4, that is, A=4, and a number of bits of the SRI indication field is $\max(\lceil \log_2(4) \rceil, 1)=2$.

At S60123, when the SRS resource set configuration information indicates the first SRS resource set and the second SRS resource set are used for the non-codebook function and indicates the number of the SRS resources included in the second SRS resource set is equal to 1, it is determined that the number of bits of the SRI indication field is $\lceil \log_2(M) \rceil$. M is the number of the SRS resources included in the first SRS resource set, and $\lceil\ \rceil$ represents round up.

According to embodiments, when the first SRS resource set corresponding to the first TRP and the second SRS resource set corresponding to the second TRP are used for the non-codebook function, that is, in the non-codebook-based uplink transmission, if the number of the SRS resources included in the second SRS resource set is equal to 1, the number of bits of the SRI indication field may be determined according to the number of the SRS resources included in the first SRS resource set.

For example, suppose that the number of the SRS resources included in the first SRS resource set is M, and the number of the SRS resources included in the second SRS resource set is N=1, the number of bits of the SRI indication field may be determined as $\lceil \log_2(M) \rceil$.

The method according to the disclosure is applicable to a grant PUSCH transmission and a grant free PUSCH transmission, that is, the configuration solution of the SRI indication field in the grant PUSCH transmission and the grant free PUSCH transmission may be determined according to the method according to the embodiments.

According to the method for transmission configuration for multiple TRPs according to embodiments of the disclosure, the network device determines the configuration information for the SRI indication field in the DCI according to the number of the SRS resources included in the SRS resource set corresponding to each of the first TRP and the second TRP as well as whether the SRS resource set corresponding to each of the first TRP and the second TRP is used for the codebook function or the non-codebook function. In detail, when one of the number of the SRS resources included in the SRS resource set corresponding to the first TRP and the number of the SRS resources included in the SRS resource set corresponding to the second TRP is equal to 1, the configuration information for the SRI indication field in the DCI for indicating the selected SRS resource for the TRP corresponding to the SRS resource set including more than one SRS resource is determined according to whether the SRS resource set is used for the codebook function or the non-codebook function, thereby providing a solution for configuring an SRI indication field, suitable for a multi-TRP scenario, which remedies the deficiency in the related art.

Corresponding to the method for transmission configuration for multiple TRPs according to the above embodiments, an apparatus for transmission configuration for multiple TRPs is further according to the disclosure. Since the apparatus for transmission configuration for multiple TRPs according to embodiments of the disclosure corresponds to the method for transmission configuration for multiple TRPs according to embodiments, which will not be described according to embodiments.

Figure 7:
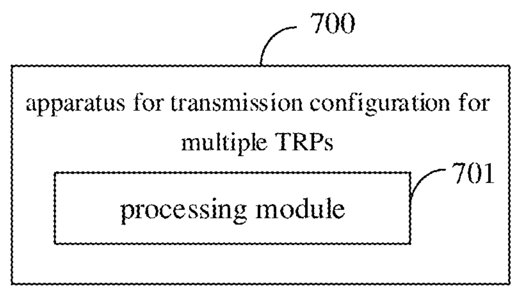
FIG. 7 is a block diagram illustrating an apparatus for transmission configuration for multiple TRPs according to embodiments of the disclosure.

FIG. 7 is a block diagram illustrating an apparatus for transmission configuration for multiple TRPs according to embodiments of the disclosure. The apparatus is applicable to a network device.

As illustrated in FIG. 7, the apparatus 700 for transmission configuration for multiple TRPs includes a processing module 701.

The processing module 701 is configured to determine configuration information for an SRI indication field in a DCI according to SRS resource set configuration information of the first TRP and the second TRP. The SRS resource set configuration information indicates a number of SRS resources included in a first SRS resource set corresponding to the first TRP and a number of SRS resources included in a second SRS resource set corresponding to the second TRP, and indicates whether the first SRS resource set and the second SRS resource set are used for a codebook function or a non-codebook function.

According to the apparatus for transmission configuration for multiple TRPs according to embodiments of the disclosure, the configuration information for the SRI indication field in the DCI is determined according to the number of the SRS resources included in the SRS resource set corresponding to each of the first TRP and the second TRP as well as whether the SRS resource set corresponding to each of the first TRP and the second TRP is used for the codebook function or the non-codebook function, thereby providing a solution for configuring an SRI indication field, suitable for a multi-TRP scenario, which remedies the deficiency in the related art.

According to some embodiments, the processing module 701 may be configured to: when the SRS resource set configuration information indicates the number of the SRS resources included in the first SRS resource set and the number of the SRS resources included in the second SRS resource set are greater than 1, determine configuration information for indicating a number of bits of a first SRI indication field and a number of bits of a second SRI indication field in the DCI according to the SRS resource set configuration information, in which the first SRI indication field is configured to indicate a selected SRS resource for the first TRP, and the second SRI indication field is configured to indicate a selected SRS resource for the second TRP.

According to some embodiments, the processing module 701 may be configured to: when the SRS resource set configuration information indicates the first SRS resource set and the second SRS resource set are used for the codebook function, determine that the number of bits of the first SRI indication field is a larger value of $\lceil \log_2(M) \rceil$ and $\lceil \log_2(N) \rceil$ and the number of bits of the second SRI indication field is $\lceil \log_2(N) \rceil$, in which M is the number of the SRS resources included in the first SRS resource set, N is the number of the SRS resources included in the second SRS resource set, and $\lceil\ \rceil$ represents round up.

According to some embodiments, the processing module 701 may be configured to: when the SRS resource set configuration information indicates the first SRS resource set and the second SRS resource set are used for the non-codebook function, determine that the number of bits of the first SRI indication field is a larger value of $\lceil \log_2(M) \rceil$ and $\lceil \log_2(N) \rceil$ and the number of bits of the second SRI indication field is a larger value of $\lceil \log_2(A) \rceil$ and 1, in which M is the number of the SRS resources included in the first SRS resource set, A is a number of entries with a rank being X in a pre-configured SRI table, X is a rank determined according to the first SRI indication field, and $\lceil\ \rceil$ represents round up.

According to some embodiments, the processing module 701 may be configured to: when the SRS resource set configuration information indicates one of the number of the SRS resources included in the first SRS resource set and the number of the SRS resources included in the second SRS resource set is equal to 1, determine configuration information for indicating a number of bits of the SRI indication field in the DCI according to the SRS resource set configuration information. The SRI indication field is configured to indicate a selected SRS resource for a TRP in the first TRP and the second TRP, corresponding to an SRS resource set including more than one SRS resource.

According to some embodiments, the processing module 701 may be configured to: when the SRS resource set configuration information indicates the number of the SRS resources included in the first SRS resource set is equal to 1 and the first SRS resource set and the second SRS resource set are used for the non-codebook function, determine that the number of bits of the SRI indication field is $\lceil \log_2(N) \rceil$, in which N is the number of the SRS resources included in the second SRS resource set, or determining the number of bits of the SRI indication field is a larger value of $\lceil \log_2(A) \rceil$ and 1, in which A is a number of entries with a rank being 1 in a pre-configured SRI table, and $\lceil\ \rceil$ represents round up.

According to some embodiments, the processing module 701 may be configured to: when the SRS resource set configuration information indicates the number of the SRS resources included in the second SRS resource set is equal to 1 and the first SRS resource set and the second SRS resource set are used for the non-codebook function, determine that the number of bits of the SRI indication field is $\lceil \log_2(M) \rceil$, in which M is the number of the SRS resources included in the first SRS resource set, and $\lceil\ \rceil$ represents round up.

According to some embodiments, the processing module 701 may be configured to: when the SRS resource set configuration information indicates the first SRS resource set and the second SRS resource set are used for the codebook function, determine that the number of bits of the SRI indication field is $\lceil \log_2(S) \rceil$, in which S is another one of the number of the SRS resources included in the first SRS resource set and the number of the SRS resources included in the second SRS resource set, and $\lceil\ \rceil$ represents round up.

According to some embodiments, the apparatus 700 is applicable to a grant PUSCH transmission and a grant free PUSCH transmission.

A communication device and a computer readable storage medium are further provided according to embodiments of the disclosure.

Figure 8:
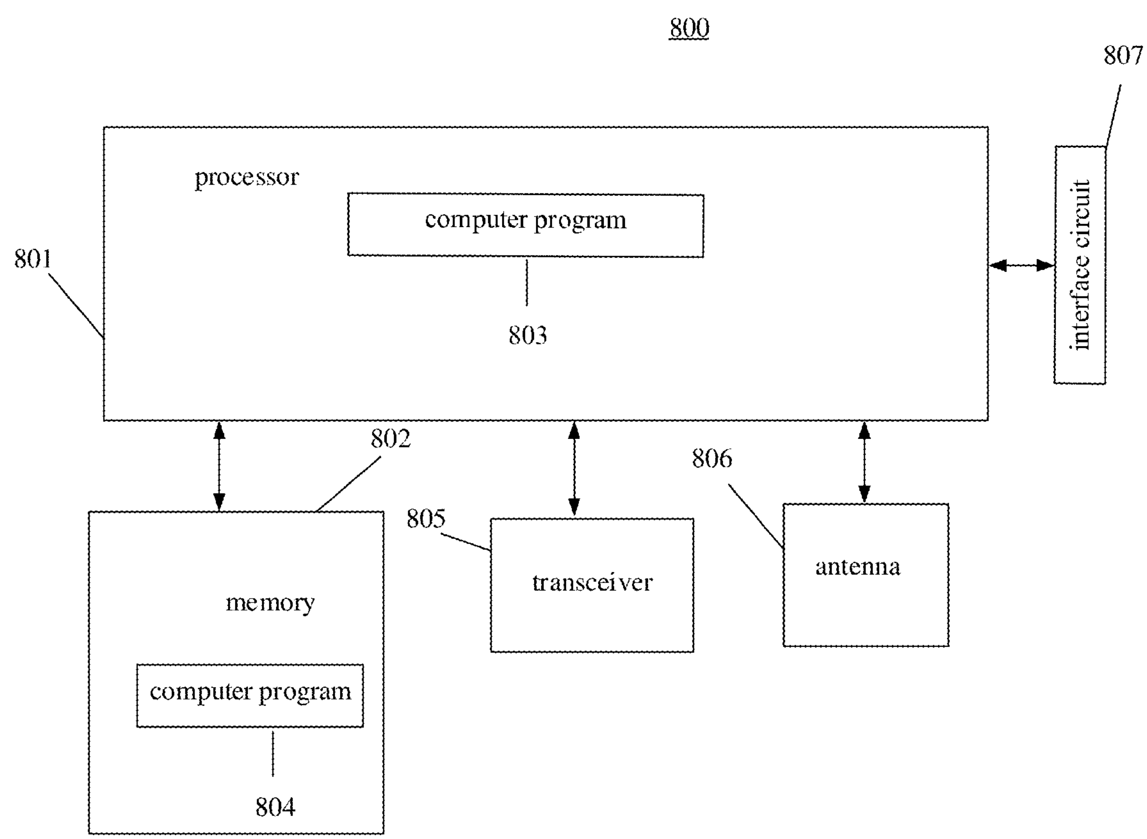
FIG. 8 is a block diagram illustrating a communication device according to embodiments of the disclosure.

Referring to FIG. 8, FIG. 8 is a block diagram illustrating a communication device 800 according to embodiments of the disclosure. The communication device 800 may be a network device, a UE, a chip, a system on chip or a processor that supports the network device to implement the methods, or a chip, a system on chip or a processor that supports the terminal device to implement the methods. The device may be configured to implement the methods described according to the method embodiments, and may refer to descriptions according to the method embodiments.

The communication device 800 may include one or more processors 801. The processor 801 may include a general-purpose processor, a special-purpose processor, or the like. For example, it may be a baseband processor or a central processing unit. The baseband processor may be used to process communication protocols and communication data. The central processing unit may be used to control the communication device (such as a base station, a baseband chip, a terminal device, a terminal device chip, a DU, a CU, or the like), to execute a computer program, process data of the computer program, and the like.

In one embodiment, the communication device 800 may further include one or more memories 802 with a computer program 804 stored thereon. The processor 801 executes the computer program 804 so that the communication device 800 performs the methods as described in the above method embodiments. In one embodiment, the memory 802 may further store data. The communication device 800 and the memory 802 may be configured alone or integrated together.

In one embodiment, the communication device 800 may further include a transceiver 805 and an antenna 806. The transceiver 805 may be referred to as a transceiving unit, a transceiver or a transceiving circuit, which may be configured to achieve a transceiving function. The transceiver 805 may include a receiver and a transmitter. The receiver may be referred to as a receiver or a receiving circuit, etc., for implementing a receiving function; and the transmitter may be referred to as a transmitter or a transmission circuit, etc. for implementing a transmitting function.

In one embodiment, the communication device 800 may further include one or more interface circuits 807. The interface circuit 807 is configured to receive code instructions and transmit the code instructions to the processor 801. The processor 801 runs the code instructions so that the communication device 800 performs the methods as described in the above method embodiments.

The communication device 800 is a network device: the processor 801 is configured to execute step S201 of FIG. 2; execute step S3011-S3012 included in S301 of FIG. 3; execute step S40111-S40112 included in S4011 in S401 of FIG. 4; and execute step S60121-S60123 included in S6012 in S601 of FIG. 6.

In an implementation, the processor 801 may include a transceiver for implementing receiving and transmitting functions. For example, the transceiver may be a transceiving circuit, or an interface, or an interface circuit. The transceiving circuit, or the interface, or the interface circuit for implementing receiving and transmitting functions may be separate or integrated. The above-mentioned transceiving circuit, interface, or interface circuit may be used for reading and writing code/data, or the above-mentioned transceiving circuit, interface, or interface circuit may be used for signal transmission/reception.

In an implementation, the processor 801 may store a computer program 803. The computer program 803 runs on the processor 801 so that the communication device 800 performs the methods as described in the above method embodiments. The computer program 803 may be solidified in the processor 801, in which case the processor 801 may be implemented by hardware.

In an implementation, the communication device 800 may include a circuit. The circuit may implement the functions of sending or receiving or communicating in the foregoing method embodiments. The processor and the transceiver described in the disclosure may be implemented in an integrated circuits (IC), an analog IC, a radio frequency integrated circuit (RFIC), a mixed-signal IC, an application specific integrated circuit (ASIC), a printed circuit board (PCB), electronic equipment, or the like. The processor and the transceiver may also be fabricated using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described according to the above embodiments may be a network device or a terminal device (for example, a first terminal device in the above method embodiments), but the scope of the communication device described in the disclosure is not limited thereto, and a structure of the communication device may not be subject to FIG. 8. The communication device may be a stand-alone device or may be a part of a larger device. For example, the communication device may be:

(1) a stand-alone IC, or a chip, or a chip system, or a chip subsystem;

(2) a set of one or more ICs, in one embodiment, the set may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handset, a mobile unit, an in-vehicle device, a network device, a cloud device, an artificial intelligence device, etc.;

(6) others.

Figure 9:
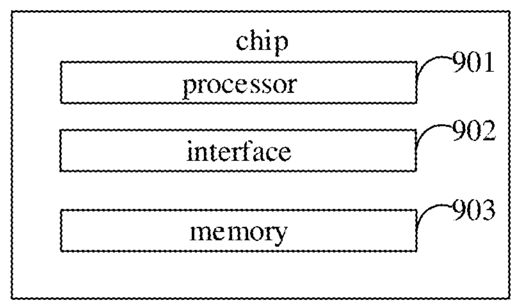
FIG. 9 is a block diagram illustrating a chip according to embodiments of the disclosure.

In the case that the communication device may be a chip or a system on chip, reference may be made to the schematic diagram of the chip as illustrated in FIG. 9. The chip illustrated in FIG. 9 may include a processor 901 and an interface 902. There may be one or more processors 901, and there may be a plurality of interfaces 902.

In the case that the chip is configured to implement functions of the network device according to embodiments of the disclosure: the processor 901 is configured to execute step S201 in FIG. 2; execute step S3011-S3012 included in S301 of FIG. 3; execute step S40111-S40112 included in S4011 in S401 of FIG. 4; and execute step S60121-S60123 included in S6012 of S601 of FIG. 6.

In one embodiment, the chip further includes a memory 903. The memory 903 is configured to save a necessary computer program and data.

Those skilled in the art may also understand that various illustrative logical blocks and steps listed in the embodiments of the disclosure may be implemented in electronic hardware, computer software, or a combination thereof. Whether such function is implemented in hardware or software depends on specific applications and overall system design requirements. Those skilled in the art may use various manners to implement functions for each specific application, but such implementation should not be understood as exceeding the protection scope of the embodiments of the disclosure.

A system for transmission configuration for multiple TRPs is further provided according to embodiments of the disclosure. The system includes an apparatus for transmission configuration for multiple TRPs serving as a network device according to embodiments of FIG. 7, or the system includes a communication device serving as a network device according to embodiments of FIG. 8.

A readable storage medium with instructions stored thereon is further provided according to the disclosure. When the instructions are executed by a computer, steps in the any one method embodiment are implemented.

A computer program product is further provided according to the disclosure. The computer program product implements functions of the above any one method embodiment when executed by a processor.

According to the above embodiments, it may be implemented in whole or in part by software, hardware, firmware, or any combination thereof. When it is implemented in software, it may be implemented in whole or in part in a form of computer program product. The computer program product includes one or more computer programs. When the computer programs are loaded and executed on the computer, flows or functions according to the embodiments of the disclosure may be generated in whole or in part. The computer may be a general purpose computer, a special purpose computer, a computer network, or other programmable device. The computer programs may be stored on a computer-readable storage medium or transferred from one computer-readable storage medium to another computer-readable storage medium, for example, the computer programs may be transferred from a website site, a computer, a server, or a data center over a wire (e.g. coaxial cable, optical fiber, digital subscriber line (DSL)) or wireless (e.g. infrared, wireless, microwave) means to another website site, another computer, another server, or another data center. The computer-readable storage medium may be any available medium that may be accessed by a computer or a data storage device such as a server, a data center, or the like that includes an integration of one or more available media. The available medium may be a magnetic medium (e.g., floppy disk, hard disk, magnetic tape), an optical medium (e.g., high-density digital video disc (DVD)), a semiconductor medium (e.g., solid state disk (SSD)), or the like.

Those skilled in the art may understand that the first, second, and other numeral numbers involved in the disclosure are only for the convenience of description, and are not used to limit the scope of the embodiments of the disclosure, which also represent a sequence.

At least one in this disclosure may also be described as one or more, which is not limited in this disclosure. A plurality of or multiple in this disclosure may be two, three, four, or more, which is not limited in this disclosure. In the embodiments of the disclosure, for a type of technical features, the technical features are distinguished by “first”, “second”, “third”, “A”, “B”, “C” and “D”, etc. There is no order or order of magnitude for the technical features described in “first”, “second”, “third”, “A”, “B”, “C” and “D”, etc.

As used herein, terms “machine readable medium” and “computer readable medium” refer to any computer program product, device, and/or apparatus (e.g., a disk, an optical disc, a memory, a programmable logic device (PLD)) used to provide machine instructions and/or data for a programmable processor, including a machine-readable medium for receiving machine instructions as machine-readable signals. The term “machine readable signal” refers to any signal used to provide machine instructions and/or data for a programmable processor.

Systems and technologies described herein may be implemented in a computing system (for example, as a data server) including a background component, or a computing system (for example, an application server) including a middleware component, or a computing system including a front-end component (for example, a user computer with a graphical user interface or a web browser, and the user may interact with implementations of the systems and technologies described herein via the graphical user interface or the web browser), or a computing system including any combination of the background component, the middleware component, or the front-end component. Components of the system may be interconnected by any form or medium of digital data communication (for example, a communication network). Examples of communication networks include: a local area network (LAN), a wide area network (WAN), and an internet.

The computer system may include a client and a server. The client and the server are generally far away from each other and generally interact with each other through a communication network. The relationship between the client and the server is generated by computer programs that run on the corresponding computer and have a client-server relationship with each other.

It should be noted that various forms of processes shown above may be used to reorder, add, or delete steps. For example, blocks described in the disclosure may be executed in parallel, sequentially, or in a different order, as long as the desired result of the technical solution disclosed in the disclosure may be achieved, which will not be limited herein.

In addition, it should be noted that, embodiments described in the disclosure may be implemented alone or implemented in combination with other embodiments when the solution is allowed.

Those skilled in the related art may realize that, in combination with units and algorithm steps of the examples described in embodiments of the disclosure, may be implemented by an electronic hardware or a combination of an electronic hardware and a computer software. Whether the functions are executed by the hardware or the software depends on a specific application and a design constraint of the technical solution. Those skilled in the art may adopt different methods for each specific application to implement the described functions, but such implementation should not be considered beyond the scope of the disclosure.

Those skilled in the art may clearly understand that, a specific working process of a system, an apparatus and a unit described above may refer to a corresponding process in the above method embodiments, which will not be repeated here.

The above are only implementations of the disclosure. However, the protection scope of the disclosure is not limited here. Changes and substitutions that may be easily considered by those skilled in the art shall be contained within the protection scope of the disclosure. Therefore, the protection scope of the disclosure shall be subject to the protection scope of claims.

What is claimed is:

1. A method for transmission configuration for multiple transmission reception points (TRPs), performed by a network device, wherein the multiple TRPs comprise a first TRP and a second TRP, and the method comprises:

determining configuration information for a sounding reference signal (SRS) resource indicator (SRI) indication field in downlink control information (DCI) according to SRS resource set configuration information of the first TRP and the second TRP;

wherein the SRS resource set configuration information indicates a number of SRS resources comprised in a first SRS resource set corresponding to the first TRP and a number of SRS resources comprised in a second SRS resource set corresponding to the second TRP, and indicates whether the first SRS resource set and the second SRS resource set are used for a codebook function or a non-codebook function.

2. The method according to claim 1, wherein determining the configuration information for the SRI indication field in the DCI comprises:

determining that the SRS resource set configuration information indicates the number of the SRS resources comprised in the first SRS resource set and the number of the SRS resources comprised in the second SRS resource set are greater than 1; and determining configuration information for indicating a number of bits of a first SRI indication field and a number of bits of a second SRI indication field in the DCI according to the SRS resource set configuration information, wherein the first SRI indication field is configured to indicate a selected SRS resource for the first TRP, and the second SRI indication field is configured to indicate a selected SRS resource for the second TRP.

3. The method according to claim 2, wherein determining the configuration information for indicating the number of bits of the first SRI indication field and the number of bits of the second SRI indication field in the DCI comprises:

determining that the SRS resource set configuration information indicates the first SRS resource set and the second SRS resource set are used for the codebook function; and determining that the number of bits of the first SRI indication field is a larger value of $\lceil \log 2(M) \rceil$ and $\lceil \log 2(N) \rceil$ and the number of bits of the second SRI indication field is $\lceil \log 2(N) \rceil$, wherein M is the number of the SRS resources comprised in the first SRS resource set, N is the number of the SRS resources comprised in the second SRS resource set, and $\lceil\ \rceil$ represents round up.

4. The method according to claim 2, wherein determining the configuration information for indicating the number of bits of the first SRI indication field and the number of bits of the second SRI indication field in the DCI comprises:

determining that the SRS resource set configuration information indicates the first SRS resource set and the second SRS resource set are used for the non-codebook function; and determining that the number of bits of the first SRI indication field is a larger value of $\lceil \log 2(M) \rceil$ and $\lceil \log 2(N) \rceil$ and the number of bits of the second SRI indication field is a larger value of $\lceil \log 2(A) \rceil$ and 1, wherein M is the number of the SRS resources comprised in the first SRS resource set, A is a number of entries with a rank being X in a pre-configured SRI table, X is a rank determined according to the first SRI indication field, and $\lceil\ \rceil$ represents round up.

5. The method according to claim 1, wherein determining the configuration information for the SRI indication field in the DCI comprises:

determining that the SRS resource set configuration information indicates one of the number of the SRS resources comprised in the first SRS resource set and the number of the SRS resources comprised in the second SRS resource set is equal to 1; and determining configuration information for indicating a number of bits of the SRI indication field in the DCI, wherein the SRI indication field is configured to indicate a selected SRS resource for a TRP in the first TRP and the second TRP, corresponding to an SRS resource set comprising more than one SRS resource.

6. The method according to claim 5, wherein determining the configuration information for indicating the number of bits of the SRI indication field in the DCI comprises:

determining that the SRS resource set configuration information indicates the number of the SRS resources comprised in the first SRS resource set is equal to 1 and the first SRS resource set and the second SRS resource set are used for the non-codebook function; and determining that the number of bits of the SRI indication field is $\lceil \log 2(N) \rceil$, wherein N is the number of the SRS resources comprised in the second SRS resource set, or determining the number of bits of the SRI indication field is a larger value of $\lceil \log 2(A) \rceil$ and 1, wherein A is a number of entries with a rank being 1 in a pre-configured SRI table, and ⌈ ⌉ represents round up.

7. The method according to claim 5, wherein determining the configuration information for indicating the number of bits of the SRI indication field in the DCI comprises:

determining that the SRS resource set configuration information indicates the number of the SRS resources comprised in the second SRS resource set is equal to 1 and the first SRS resource set and the second SRS resource set are used for the non-codebook function; and determining that the number of bits of the SRI indication field is ⌈log 2(M)⌉, wherein M is the number of the SRS resources comprised in the first SRS resource set, and ⌈ ⌉ represents round up.

8. The method according to claim 5, wherein determining the configuration information for indicating the number of bits of the SRI indication field in the DCI comprises:

determining that the SRS resource set configuration information indicates the first SRS resource set and the second SRS resource set are used for the codebook function; and determining that the number of bits of the SRI indication field is ⌈log 2(S)⌉, wherein S is another one of the number of the SRS resources comprised in the first SRS resource set and the number of the SRS resources comprised in the second SRS resource set, and ⌈ ⌉ represents round up.

9. The method according to claim 1, being applicable to a grant physical uplink shared channel (PUSCH) transmission and a grant free PUSCH transmission.

10. A communication device, comprising:

a transceiver;

a memory storing computer executable instructions; and a processor respectively connected to the transceiver and the memory and configured to:

determine configuration information for a sounding reference signal (SRS) resource indicator (SRI) indication field in downlink control information (DCI) according to SRS resource set configuration information of a first transmission reception point (TRP) and a second TRP;

wherein the SRS resource set configuration information indicates a number of SRS resources comprised in a first SRS resource set corresponding to the first TRP and a number of SRS resources comprised in a second SRS resource set corresponding to the second TRP, and indicates whether the first SRS resource set and the second SRS resource set are used for a codebook function or a non-codebook function.

11. The communication device according to claim 10, wherein the processor is further configured to perform:

determining that the SRS resource set configuration information indicates the number of the SRS resources comprised in the first SRS resource set and the number of the SRS resources comprised in the second SRS resource set are greater than 1; and determining configuration information for indicating a number of bits of a first SRI indication field and a number of bits of a second SRI indication field in the DCI according to the SRS resource set configuration information, wherein the first SRI indication field is configured to indicate a selected SRS resource for the first TRP, and the second SRI indication field is configured to indicate a selected SRS resource for the second TRP.

12. The communication device according to claim 11, wherein the processor is further configured to perform:

determining that the SRS resource set configuration information indicates the first SRS resource set and the second SRS resource set are used for the codebook function; and determining that the number of bits of the first SRI indication field is a larger value of ⌈log 2(M)⌉ and ⌈log 2(N)⌉ and the number of bits of the second SRI indication field is ⌈log 2(N)⌉, wherein M is the number of the SRS resources comprised in the first SRS resource set, N is the number of the SRS resources comprised in the second SRS resource set, and ⌈ ⌉ represents round up.

13. The device according to claim 11, wherein the processor is further configured to perform:

determining that the SRS resource set configuration information indicates the first SRS resource set and the second SRS resource set are used for the non-codebook function; and determining that the number of bits of the first SRI indication field is a larger value of ⌈log 2(M)⌉ and ⌈log 2(N)⌉ and the number of bits of the second SRI indication field is a larger value of ⌈log 2(A)⌉ and 1, wherein M is the number of the SRS resources comprised in the first SRS resource set, N is the number of the SRS resources comprised in the second SRS resource set, A is a number of entries with a rank being X in a pre-configured SRI table, X is a rank determined according to the first SRI indication field, and ⌈ ⌉ represents round up.

14. The communication device according to claim 10, wherein the processor is further configured to perform:

determining that the SRS resource set configuration information indicates one of the number of the SRS resources comprised in the first SRS resource set and the number of the SRS resources comprised in the second SRS resource set is equal to 1; and determining configuration information for indicating a number of bits of the SRI indication field in the DCI, wherein the SRI indication field is configured to indicate a selected SRS resource for a TRP in the first TRP and the second TRP, corresponding to an SRS resource set comprising more than one SRS resource.

15. The communication device according to claim 14, wherein the processor is further configured to perform:

determining that the SRS resource set configuration information indicates the number of the SRS resources comprised in the first SRS resource set is equal to 1 and the first SRS resource set and the second SRS resource set are used for the non-codebook function; and determining that the number of bits of the SRI indication field is ⌈log 2(N)⌉, wherein N is the number of the SRS resources comprised in the second SRS resource set, or determining the number of bits of the SRI indication field is a larger value of ⌈log 2(A)⌉ and 1, wherein A is a number of entries with a rank being 1 in a pre-configured SRI table, and ⌈ ⌉ represents round up.

16. The communication device according to claim 14, wherein the processor is further configured to perform:

determining that the SRS resource set configuration information indicates the number of the SRS resources comprised in the second SRS resource set is equal to 1 and the first SRS resource set and the second SRS resource set are used for the non-codebook function; and determining that the number of bits of the SRI indication field is $\lceil \log 2(M) \rceil$, wherein M is the number of the SRS resources comprised in the first SRS resource set, and $\lceil\ \rceil$ represents round up.

17. The device according to claim 14, wherein the processor is further configured to perform:

determining that the SRS resource set configuration information indicates the first SRS resource set and the second SRS resource set are used for the codebook function; and determining that the number of bits of the SRI indication field is $\lceil \log 2(S) \rceil$, wherein S is another one of the number of the SRS resources comprised in the first SRS resource set and the number of the SRS resources comprised in the second SRS resource set, and $\lceil\ \rceil$ represents round up.

18. A non-transitory computer-readable storage medium storing computer executable instructions, wherein when the computer executable instructions are executed by a processor, the processor is caused to perform a method for transmission configuration for multiple transmission reception points (TRPs), wherein the multiple TRPs comprise a first TRP and a second TRP, and the method comprises:

determining configuration information for a sounding reference signal (SRS) resource indicator (SRI) indication field in downlink control information (DCI) according to SRS resource set configuration information of the first TRP and the second TRP;

wherein the SRS resource set configuration information indicates a number of SRS resources comprised in a first SRS resource set corresponding to the first TRP and a number of SRS resources comprised in a second SRS resource set corresponding to the second TRP, and indicates whether the first SRS resource set and the second SRS resource set are used for a codebook function or a non-codebook function.

19. A method for transmission configuration for multiple transmission reception points (TRPs), performed by a communication system comprising a network device and a user equipment, wherein the multiple TRPs comprise a first TRP and a second TRP, and the method comprises:

determining, by the network device, configuration information for a sounding reference signal (SRS) resource indicator (SRI) indication field in downlink control information (DCI) according to SRS resource set configuration information of the first TRP and the second TRP; and receiving, by the user equipment, the configuration information;

wherein the SRS resource set configuration information indicates a number of SRS resources comprised in a first SRS resource set corresponding to the first TRP and a number of SRS resources comprised in a second SRS resource set corresponding to the second TRP, and indicates whether the first SRS resource set and the second SRS resource set are used for a codebook function or a non-codebook function.

* * * * *